United States Patent [19]

Macpherson et al.

[11] Patent Number: 5,853,464
[45] Date of Patent: Dec. 29, 1998

[54] PIGMENT COMPOSITIONS

[75] Inventors: Ian Alexander Macpherson, Crail; Iain Frank Fraser, Kilbirnie; Sharon Kathleen Wilson, Pottershill; Peter Cyril White, Drymen, all of Scotland; Calum Hugh Munro, Pittsburgh, Pa.; William Ewen Smith, Glasgow, Scotland

[73] Assignee: Ciba Specialty Chemicals Corporation, Tarrytown, N.Y.

[21] Appl. No.: 854,009

[22] Filed: May 8, 1997

[30] Foreign Application Priority Data

Oct. 15, 1996 [GB] United Kingdom ............... 9609793

[51] Int. Cl.⁶ .................................................. C09B 67/50
[52] U.S. Cl. ................. 106/316; 106/31.75; 106/31.76; 106/31.77; 106/31.78; 106/31.79; 106/31.8; 106/31.81; 106/403; 106/404; 106/413; 106/493

[58] Field of Search .................... 106/31.6, 31.75, 106/31.76, 31.77, 31.78, 31.79, 31.8, 31.81, 403, 404, 413, 493

[56] References Cited

U.S. PATENT DOCUMENTS

| 4,221,593 | 9/1980 | Kubo ........................................ 106/404 |
| 5,324,567 | 6/1994 | Bratchley et al. ...................... 428/195 |
| 5,718,754 | 2/1998 | Macpherson et al. .................. 106/413 |

FOREIGN PATENT DOCUMENTS

| 2839501 | 3/1979 | Germany . |
| 9111492 | 8/1991 | WIPO . |

*Primary Examiner*—Mark L. Bell
*Assistant Examiner*—Scott L. Hertzog
*Attorney, Agent, or Firm*—Kevin T. Mansfield

[57] ABSTRACT

The present invention provides an ink which contains a SERS—active metal aggregate containing a Raman active compound.

16 Claims, No Drawings

PIGMENT COMPOSITIONS

PIGMENT COMPOSITIONS

The present invention relates to ink compositions, especially for use on banknotes and other security items.

Security-printed items such as banknotes, cheques, passports, licences, tickets and branded items need to be produced in a manner which allows the genuine article to be authenticated. Various measures have been adopted ranging from easily visible features to features which are only verified by a machine.

The use of Raman and resonance Raman scattering spectroscopy has been described as a detection method for use with inks containing Raman active compounds as a constituent; for example polydiacetylenes (U.S. Pat. No. 5,324,567).

Normal Raman scattering (RS) is a very weak effect and gives low intensity signals, which can make detection difficult. It is advantageous to obtain as high a scattering intensity as possible since this decreases the detection limit and much smaller amounts of Raman active compound are required.

By tuning the laser frequency to match an absorption maximum of the Raman active compound, scattering can be increased in efficiency by a factor of $10^3$ to $10^4$ due to resonance with the molecular electronic transition. This is resonance Raman scattering (RRS).

A second, separate method used to increase the signal intensity is surface enhanced Raman scattering (SERS). Surface enhancement is a well known phenomenon (see for example J. A. Creighton, Chapter 2 "Spectroscopy and Surfaces"; R. J. H. Clark, R. E. Hester-Eds.). It arises from molecules which have been adsorbed onto a roughened surface, for example, roughened electrodes or aggregated colloids of nano-scale particles of SERS-active metals, such as silver, gold, copper, and lithium.

Surface enhancement can increase the intensity of the Raman scattering by up to $10^6$. The size of the effect is dependent on a) the nature of the surface roughness b) the distance of the Raman active molecules from the surface c) the orientation of the molecules on the surface and d) the metal. Thus sensitivity varies widely depending on the exact nature of preparation of the surface or aggregated colloid and the method of addition of the Raman active molecules.

The scattering from a Raman active molecule on or near the surface of a SERS-active metal can be further enhanced when the laser light frequency is in resonance with an electronic transition of the Raman active molecule. This is termed surface enhanced resonance Raman scattering (SERRS). The sensitivity of SERRS is much greater than the sum of SERS and RRS (see for example Munro, C. H.; Smith, W. E.; Armstrong, D. R.; White, P. C.; J. Phys. Chem. 1995, 99, 879–885. The indentification of the Raman active molecule present is also extremely specific.

Surprisingly we have found that SERRS provides an ideal medium to obtain hidden security coding in inks. It is robust and molecularly specific.

The present invention is based on the discovery that colloids or other small metal particles of SERS active metals onto which has been adsorbed a Raman active compound, hereafter known as the coding compound, are of value as components of an ink as printing security documents which can be identified simply and quickly by SERS or SERRS.

SERRS has significant advantages over SERS for use in security ink systems. The sensitivity is much higher and there is a greater degree of selectivity with only vibrations from the coding compound being detected. This leads directly to more precise identification of each species and to the ability to sense a number of different well defined coding compounds in one system. In addition, photodecomposition is minimised by SERRS since the energy transfer process between the coding compound and the surface reduces the lifetime of excited states and low powdered lases can be employed. Further, SERRS can be used with both fluorescing and non-fluorescing compounds since fluorescence is quenched at the surface. Thus, in an ink system, a robust selective and easily hidden system is provided for detection by SERS, or preferably by SERRS.

Such an ink may be doped with extremely small quantites of the SERRS-active metal aggregates of colloids or other small metal particles containing the coding compound, hereafter known as the SERRS active sol. The ink can be printed by normal lithographic printing processes.

The sensitivity is so great that unique, easily distinguished signals may be obtained from inks which contain so little of the specially prepared SERRS active sol that these inks are otherwise indistinguishable from clear varnish.

Alternatively, the ink itself may be pigmented normally with one or more conventional pigments, as well as containing the SERRS active sol.

After lithographic printing, SERS/SERRS detection equipment can clearly identify the characteristic spectrum of the coding compound. The areas of surface required for examination can be as low as 1 $\mu m^2$, if a suitable simple microscope attachment is used. Alternatively it may be more convenient to examine a slightly larger area of surface with, e.g. a fibre optic attachment.

Accordingly, the present invention provides an ink which contains as one of its components a SERRS active sol as defined above.

The aggregated colloids of nano scale particles of SERS active metal which make up the SERRS active sol may be prepared from any metal which exhibits SERS activity. Preferred metals are silver, gold, and copper. Especially preferred metals are silver and gold. Other metals such as aluminum may also be used.

The colloids can be prepared from reduction of a soluble precursor, for example a metal salt in aqueous or solvent environment by controlled addition of a colloid generating agent such as citrate or borohydride or by other conventional comminution techniques. Examples of such preparations are described in the literature see, for example Lee P. C. and Meisel D. J. Phys. Chem. 1982, 86, 3391 or the J. A. Creighton article above. The size of the colloids should be between 2 and 150 nm. Especially between 5 and 70 nm.

The reduction may be carried out over a wide range of temperatures from 0° C. to 100° C.

The solutions of reactants used to make the colloids may contain from $10^{-4}$ mol/liter to $10^{-1}$ mol/liter preferably from $10^{-3}$ mol/liter to $10^{-2}$ mol/liter of reactant.

The coding compound which is adsorbed on the surface of the SERS active metal colloid may be selected from any compound which exhibits a characteristic Raman spectrum. SERRS is preferred over SERS, where coding compounds are used which have a suitable electronic transition. Preferably the laser frequency is chosen to be close to that of the electronic transition and/or the frequency of the SERS plasmon resonance of the SERS active metal colloid.

The coding compound should preferably be such that it gives a strong interaction with the SERS active metal colloid surface.

The coding compound may be added to the medium containing the SERS active metal colloid as a solid or solution. It may be added before, during or after the reduction of the soluble metal precursor.

The amount of the coding compound added may be between 0.1 and 100 ppm, preferably between 0.5 and 10 ppm of the SERS active metal colloid.

The coding compound may be a dye or pigment and may be for example a phthalocyanine, a perinone, a quinacridone, an indanthrone, a flavanthrone, a pyranthrone, a perylene, a thioindigo, a dioxazine, an isoindoline, a diketopyrrolopyrrole, a basic dye complex, a metal complex, a monoazo, an azo metal salt, a disazo or a ferricyanide.

Preferably coding compounds are used which have similar electronic absorption frequencies to the SERS plasmon resonance frequency.

The surface charge properties and aggregation behaviour of the SERS active metal colloid may be modified by addition of an aggregation agent.

The aggregation agent should preferably be soluble or partially soluble in the aqueous or solvent system used to prepare the SERS active metal colloid.

The aggregation agent may be added to the medium containing the SERS active metal colloid as a solid or solution. It may be added before, during or after the reduction of the soluble metal precursor. It is preferably added after the reduction of the soluble metal precursor.

The amount of the aggregation agent added may be between 0.001 and 5% preferably between 0.01 and 1% (by weight) of the SERS active metal colloid.

Suitable aggregation agents are organic and mineral acids such as ascorbic acid and nitric acid, halide ions and soluble polymeric agents.

An especially preferred aggregation agent is poly(L-lysine).

An additional advantage of addition of an aggregation agent can be modification of the surface charge of the SERS active metal colloid, enabling a wider range of coding compounds to be used.

A suitable composition of SERRS active sol is, for example, silver metal, prepared from reduction of silver nitrate by citrate in aqueous medium, subsequently treated with poly(L-lysine) and copper phthalocyanine sulphonic acid.

The copper phthalocyanine sulphonic acid has an electronic absorption maximum at 673 nm. Thus by using laser illumination at a frequency close to 673 nm, the SERRS active sol can be easily detected.

The SERRS active sol can subsequently be subjected to usual pigment treatments such as resination by a natural or synthetic resin. It can then be isolated by conventional filtration and drying techniques.

If used in conjunction with conventional pigments for coloured security inks, the SERRS active sol may be dry blended with one or more conventional pigments before being incorporated into the ink medium. Alternatively, the SERRS active sol and conventional pigments may be incorporated independently into the ink medium.

Alternatively, the SERRS active sol, whilst in the form of slurry or presscake, can be added to a pigment slurry containing one or more conventional pigments. This mixture can then be isolated by conventional filtration and drying techniques.

The SERRS active sols of the invention may be used to form inks such as those used in lithographic (direct and offset), letterpress, gravure, flexographic or screen printing, or to form radiation curable inks such as infrared and ultraviolet curable inks.

The SERRS active sol may be present in the ink between 0.01 and 10%, preferably between 0.1 and 2% by weight.

The ink may contain other components such as other, conventional pigments and driers.

The present invention also comprises an ink containing an ink vehicle, a SERRS active sol of the invention and optionally a conventional pigment.

A preferred embodiment of the invention is the use of SERRS active sols having an electronic absorption maximum in a region of the spectrum where the conventional pigment has low absorption.

Inks of the invention are primarily intended to be printed on the security documents and other items which need to be authenticated. In this context, the substrates used for printing are generally paper, including rag paper, preferably currency-grade paper, plastics-coated or laminated paper, and plastics such as, for example, bankcard-grade PVC, or plastic paper, e.g. non woven plastic paper. Articles bearing security printing include banknotes, banknote thread, currency, travellers' cheques, bonds, certificates, stamps, lottery tickets, ownership documents, passports, identity cards, credit cards, charge cards, access cards, smart cards, brand authentication labels and tags, and tamperproof labels.

Security documents normally have different types of printing present selected from intaglio, offset lithographic, letterpress printing and occasionally gravure. An ink of the invention will normally be used in addition to/beside security-printed areas in a variety of colours. Rainbow-printing techniques are often used in security documents.

The SERRS active sol of the invention may also be included in electro-photographic toners, matrix or daisy-wheel printer inks, and non-impact printing methods.

The SERRS active sol of the invention may also be included, not necessarily as inks, in paper including rag papers and plastic papers, banknote threads, plastic cards and other security documents or items which need to be authenticated, if necessary blended with a polymer and bonded other than in an ink. The SERRS active sol of the invention may be deposited in a single area or a series of areas. If necessary or desired in a coded pattern.

The SERRS active sol may be incorporated into items which need to be authenticated e.g. by incorporating it in a label such as a halographic label bearing printing in an ink containing a SERRS active sol, or in a hot-stamping foil construction. In general, the SERRS active sol may be on or near the surface of the item to be authenticated.

The invention is illustrated by the following Examples.

EXAMPLE 1

Silver nitrate, analytical reagent grade, ex. Johnson Matthey (90 mg) is added to distilled water (500 ml) in a beaker which has been previously cleaned with aqua regia followed by a soap solution and washed with distilled water. The mixture is rapidly heated to 100° C. with stirring. A 1% aqueous solution of sodium citrate, analytical reagent grade, ex. Johnson Matthey (10 ml) is added with vigorous stirring and the solution kept at 100° C. for 80 minutes with continuous stirring. The mixture is then allowed to cool to room temperature.

To an aliquot of this mixture (2 ml) is added a 0.01% aqueous solution of poly(L-lysine) hydrobromide, m. wt. 23,000, analytical reagent grade, ex. Sigma (150 µl) followed by a $10^{-8}$ mol $l^{-1}$ aqueous solution of copper phthalocyanine sulphonic acid (100 μl).

EXAMPLE 2

Silver nitrate, analytical reagent grade, ex. Johnson Matthey (90 mg) is added to distilled water (500 ml) in a beaker which has been previously cleaned with aqua regia followed by a soap solution and washed with distilled water. The mixture is rapidly heated to 100° C. with stirring. A 1% aqueous solution of sodium citrate, analytical reagent grade, ex. Johnson Matthey (10 ml) is added with vigorous stirring and the solution kept at 100° C. for 80 minutes with continuous stirring. The mixture is then allowed to cool to room temperature.

To an aliquot of this mixture (2 ml) is added 0.5 μg of 1,4-diketo-3,6-di(p-chlorophenyl)pyrrolo-[3,4-c]-pyrrole.

EXAMPLE 3

A beaker containing 200 ml of distilled water is placed in an ice bath. To the stirred water is added, over 80 minutes, a 0.04 mol $l^{-1}$ aqueous solution of silver nitrate, Analar grade, ex. B.D.H. (100 ml) which is at 4° C.; and, simultaneously, over 40 minutes, a 0.1 mol $l^{-1}$ aqueous solution of sodium borohydride, Spectrosol grade ex B.D.H. (100 ml). 5 minutes after the start of the addition of the silver nitrate and sodium borohydride solutions, a solution of dimethylaminomethyl copper phthalocyanine (0.52 g) in 50 ml of a 50/50 mixture of ethanol/water at 4° C. is added over 35 minutes. The pH of the resulting mixture is raised to 11.2 by addition of dilute, aqueous sodium hydroxide and a solution of Staybelite resin (a hydrogenated wood rosin, ex Hercules Inc. 0.1 g) in 25 ml dilute aqueous sodium hydroxide is added. The resinated mixture is stirred for 5 minutes before the pH is lowered to 6.4 using dilute hydrochloric acid. The solid is collected by centrifugation and air dried.

EXAMPLE 4

The SERRS active sol of Example 3 (38.2 mg) is hand mixed with 50 g of an ink varnish containing 32 parts long oil alkyd 50 parts modified phenolic resin 18 parts ink oil The ink was given 2 passes through a triple roll mill.

The ink is printed using a Prufbau printer onto a selection of paper substrates. The print weight is adjusted to approximately 1.25 g of ink per square meter of printed surface.

Detection

Detection of the SERRS active sols is by use of an Anaspec modified Cary 81 Spectrometer using 20–50 mW of tunable radiation provided by an Argon Ion Laser as a pump and a Spectra Physics 375 Dye Laser with DCM dye.

EXAMPLE 5

The detected spectrum from the SERRS active sol prepared in Example 1 using λ ex=680 nm produces resonance peaks at 1530 $cm^{-1}$, 1450 $cm^{-1}$, 1340 $cm^{-1}$, 954 $cm^{-1}$, 775 $cm^{-1}$, 712 $cm^{-1}$, 680 $cm^{-1}$, 592 $cm^{-1}$ and 488 $cm^{-1}$.

EXAMPLE 6

The detected spectrum from the SERRS active sol prepared in Example 2 using λ ex=457.9 nm produces resonance peaks at 1660 $cm^{-1}$, 1579 $cm^{-1}$, 1552 $cm^{-1}$, 1498 $cm^{-1}$, 1445 $cm^{-1}$, 1400 $cm^{-1}$, 1344 $cm^{-1}$ and 1315 $cm^{-1}$.

EXAMPLE 7

The detected spectrum from the ink prepared in Example 4 using λ ex=514.5 nm produces resonance peaks at 1627 $cm^{-1}$, 1525 $cm^{-1}$ and 1338 $cm^{-1}$.

We claim:

1. An ink which contains as one of its components a surface enhanced resonance Raman scattering (SERRS) active sol.

2. An ink as claimed in claim 1 in which the SERRS active sol is prepared from silver, gold, copper or aluminum.

3. An ink as claimed in claim 1 in which the SERRS active sol contains a coding compound which exhibits a characteristic Raman spectrum.

4. An ink as claimed in claim 1 in which the SERRS active sol contains a coding compound which has a similar electronic absorption frequency to a SERS plasmon resonance frequency.

5. An ink as claimed in claim 1 in which the amount of coding compound in the SERRS active sol is between 0.1 and 100 ppm of a SERS active metal colloid.

6. An ink as claimed in claim 1 in which the SERRS active sol also contains an aggregation agent.

7. An ink as claimed in claim 6 in which the amount of aggregation agent is between 0.001 and 5% by weight of the SERS active metal colloid.

8. An ink as claimed in claim 1 in which the SERRS active sol is resinated by a natural or synthetic resin.

9. An ink as claimed in claim 1 in which the amount of SERRS active sol is between 0.01 and 10% by weight.

10. An ink as claimed in claim 1 which also contains pigments and driers.

11. An ink as claimed in claim 1 in which the SERRS active sol comprises silver metal, poly(L-lysine) and copper phthalocyanine sulphonic acid.

12. A method of preparing a surface enhanced resonance Raman scattering (SERRS) active sol which comprises reducing a soluble precursor of a metal which exhibits surface enhanced resonance Raman scattering activity and adding a coding compound during the reduction.

13. A method as claimed in claim 12 in which the reduction is carried out at a temperature from 0° C. to 100° C.

14. A method as claimed in claim 12 in which the reactants are present in a concentration of from $10^{-4}$ mol/liter to $10^{-1}$ mol/liter.

15. A method as claimed in claim 12 in which the SERRS active sol is resinated by a natural or synthetic resin before it is isolated.

16. A surface enhanced resonance Raman scattering (SERRS) active sol which is resinated with a natural or synthetic resin.

* * * * *

UNITED STATES PATENT AND TRADEMARK OFFICE
CERTIFICATE OF CORRECTION

PATENT NO. : 5,853,464
DATED : DECEMBER 29, 1998
INVENTOR(S) : IAN ALEXANDER MACPHERSON ET AL.

It is certified that error appears in the above-identified patent and that said Letters Patent is hereby corrected as shown below:

Title page, left column, section [30], should read:

-- Foreign Application Priority Data

May 10, 1996   [GB]   United Kingdom         9609793 --.

Signed and Sealed this

Thirty-first Day of August, 1999

Attest:

Q. TODD DICKINSON

*Attesting Officer*        *Acting Commissioner of Patents and Trademarks*